(12) United States Patent
Jesness, III

(10) Patent No.: US 7,665,244 B2
(45) Date of Patent: Feb. 23, 2010

(54) PLANT MOVER SYSTEM AND METHOD

(75) Inventor: Peter M. Jesness, III, Henderson, NV (US)

(73) Assignee: Revolutionary Garden Products, Inc., Henderson, NV (US)

( * ) Notice: Subject to any disclaimer, the term of this patent is extended or adjusted under 35 U.S.C. 154(b) by 280 days.

(21) Appl. No.: 11/958,718

(22) Filed: Dec. 18, 2007

(65) Prior Publication Data

US 2009/0151244 A1    Jun. 18, 2009

(51) Int. Cl.
*A47G 7/00* (2006.01)
(52) U.S. Cl. ............................................ 47/39; 47/66.6
(58) Field of Classification Search .................. 47/39, 47/66.6; 108/94; 248/349.1
See application file for complete search history.

(56) References Cited

U.S. PATENT DOCUMENTS

| 729,642 | A | * | 6/1903 | Nash | 108/94 |
|---|---|---|---|---|---|
| 1,208,457 | A | * | 12/1916 | Bellville | 108/94 |
| 1,254,983 | A | * | 1/1918 | Chadwick | 108/22 |
| 3,897,063 | A | * | 7/1975 | Lehwalder | 273/280 |
| 4,051,627 | A | * | 10/1977 | Schilling, Jr. | 47/39 |
| 4,175,354 | A | * | 11/1979 | Anderson | 47/39 |
| 4,969,290 | A | * | 11/1990 | Skoretz | 47/39 |
| 5,896,699 | A | * | 4/1999 | Livingston et al. | 47/39 |
| 6,128,854 | A | * | 10/2000 | Chaney | 47/39 |
| D486,042 | S | | 2/2004 | Stolzenberg | |
| 2009/0151244 | A1 | * | 6/2009 | Jesness, III | 47/65 |

OTHER PUBLICATIONS

Website page showing Plant-A-Matic (http://plantamatic.net) dated Nov. 19, 2007.
Website page for Solar Plant Turner Kit with Stand (www.kelvin.com) dated Nov. 19, 2007.
Internet article entitled, "Solar Plant Rotator will keep your flora evenly exposed to sun," The Gazette (Colorado Springs), Aug. 2, 2005.
Website page for Stouffer Technologies, Inc. for RotoPlant Plant Turner (www.stouffertech.com/rotoplant/) dated Nov. 19, 2007.

* cited by examiner

*Primary Examiner*—Francis T Palo
(74) *Attorney, Agent, or Firm*—Procopio, Cory, Hargreaves & Savitch, LLP; Lisel M. Ferguson

(57) ABSTRACT

A system and method for rotating multiple plants through light on a continual basis and feeding plants while they are rotated. This system is able to provide the plants with food and water at levels inputted into its control panel. The water which runs through the system can be re-circulated and used by the plants. The system aerates the water in the re-circulation chamber before it is put back onto the plants. This system also has the capabilities to test the pH and nutrient level of the growing media which can include but is not limited to one or more of the following: spun rock, clay pellets, soil, or any other hydroponic growing media.

17 Claims, 6 Drawing Sheets

PLANT MOVER SYSTEM AND METHOD

FIELD OF THE INVENTION

The present invention relates, in general, to a system and method for rotating multiple plants through light on a continual basis and feeding plants while they are rotated.

BACKGROUND OF THE INVENTION

Indoor gardening is becoming increasingly more popular. Gardening indoors allows seasonal plants to be grown year round. Often times indoor growing yields in a larger crop of fruits or vegetables as a result of the ability to control adverse environmental factors such as temperatures, water and bugs. However, one of the biggest problems with indoor gardening is that the plants do not receive an even distribution of light. Unlike outdoors where the sun moves across the sky during the day, indoor lights do not move. There are some indoor growing lights which move however these have drawbacks in that they still do not evenly distribute the light to plants with just the light moving. Plants which are in the corners or which are very close together still do not get light on some of their leaves.

Currently there are plant rotators in existence which can handle just one hanging plant or one plant places on a tray but not multiple plants. However, even these single plant systems have many drawbacks in that they are not capable of feeding and watering the plant during the rotation. With these existing rotators the grower must manually feed and water the plants. These rotators are also incapable of testing the soil pH or soil nutrients or recirculating the water. There is, thus, a need for a plant moving system and method which can move plants on a continual basis in all directions and can simultaneously feed and water these plants.

SUMMARY OF THE INVENTION

This invention involves a process and method for manufacturing and using a complete plant growing system. This system rotates multiple plants through the light on a continual basis. Each plant rotates on two disks so that every surface of the plants is exposed to light. This system allows the plants to receive up to 70% more exposure to light than plants which are not rotated. The ability of this system to utilize two rotating wheels is very important; this enables the outside of the plants and the inside of the plants to obtain equal light. This system also waters and feeds the plants while they are rotating through the light. The plants are watered by a recirculating system. The water which filters through the plant and drains out the bottom of the pot is pumped back through the watering apparatus of the system. Thus, the system is capable of re-circulating its water. In alternative embodiments, the water can be aerated while it is in the system before it is pumped back through the plants. This can be accomplished with an air pump or air stones. The system can also be configured so that the water is not re-circulated.

The system is made with a control panel which contains a constant metering of Parts Per Million ("P.P.M.") of plant food, temperature and pH "acidity" or "alkalinity" of the water. The control panel also contains a control for the speed of the large disk rotation. The large disk rotation can be set at a constant speed over time. In alternate embodiments, the speed of the system can be increased or decreased depending on the needs of the particular plants. In one embodiment this system also comes with the capability to monitor the pH level and nutrient level of the growing media which can include but is not limited to one or more of the following: spun rock, clay pellets, soil, or any other hydroponic growing media. These capabilities enable the grower to prevent nutrient lockout which results in shock of the plants resulting in starvation.

In a preferred embodiment this is a system and method wherein the plant mover has two or more small disks, which are placed on a larger outer disk. The larger disk is rotated by a motor. The plants sit on the small disks which are placed on top of the large disk. As the large disk is rotated by the motor the small disks on top rotate as well. The small disks are further turned in a second rotation by the interconnection of the notches on their periphery catching on the matching notches of the lid of the upper component of the system. As the plants are rotated, a watering apparatus waters the plants. The watering apparatus can be hooked up to the control panel so that the plants are watered and fed at set intervals. The watering apparatus is configured so that the water which is given to the plants is re-circulated through the system and re-used. In an alternate embodiment, the water can be drained out of the system and new water can be pumped in should the user not desire to utilize the re-circulation feature. This system can be manufactured with wheels on its underside so that it can be easily moved or relocated. In a preferred embodiment, the system is manufactured with four small disks so that four plants are able to be set on the unit. However, in an alternate embodiment more disks could be utilized with this system enabling it to function with more than four plants.

The system is also equipped with extra sockets. These sockets can be used to plug in a radiator unit to control the temperature of the water being fed to the plants. Alternatively, these sockets can be used to plug in a lighting system for the plants or other component which utilizes power. This system is ideally manufactured from a durable and light material so that it can be easily shipped and moved once assembled.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings.

DETAILED DESCRIPTION OF PREFERRED EMBODIMENTS

Figure 1:
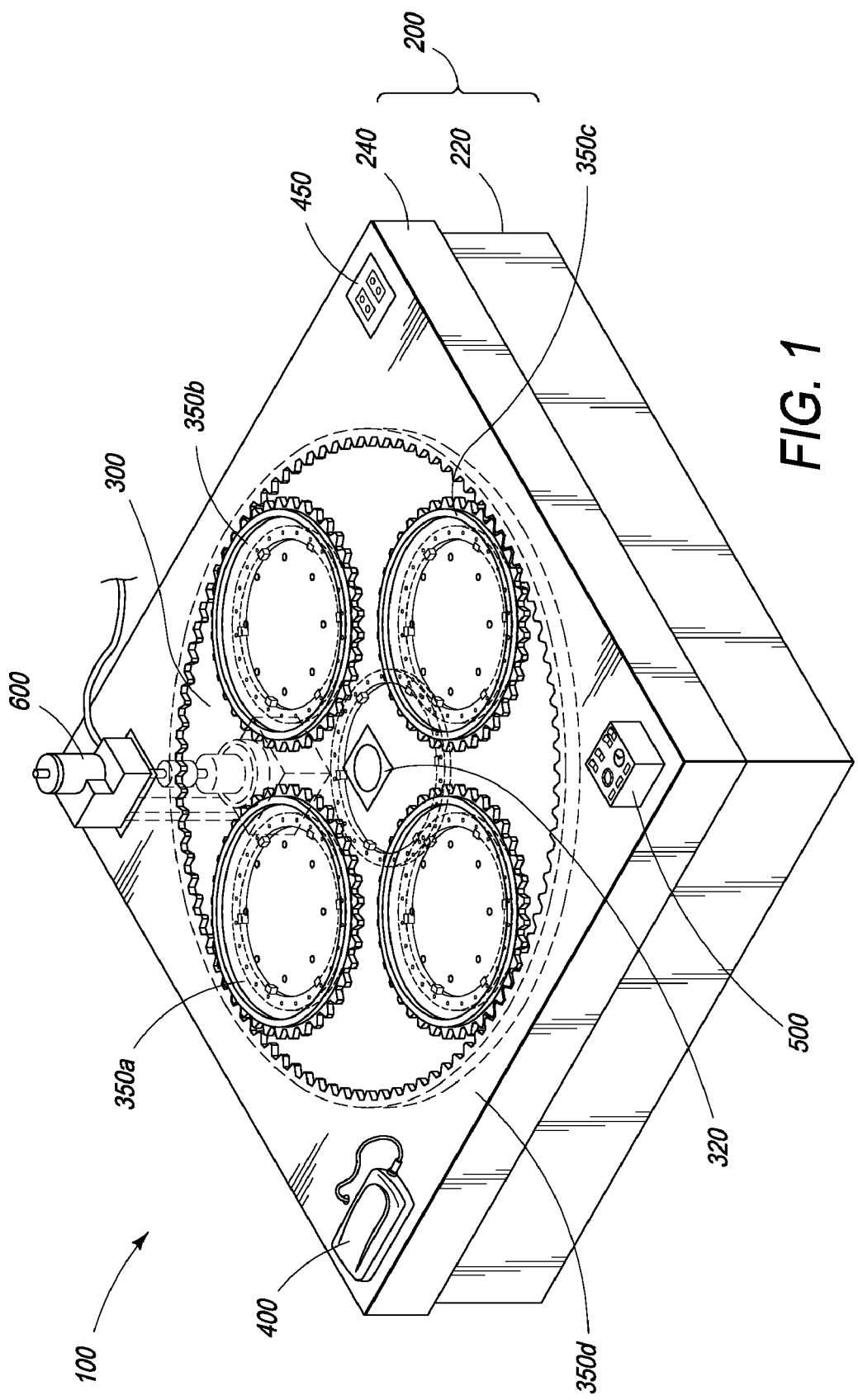
FIG. 1 is a perspective view of an embodiment of an plant mover system.

After reading this description it will become apparent to one skilled in the art how to implement the invention in various alternative embodiments and alternative applications. However, all the various embodiments of the present invention will not be described herein. It is understood that the embodiments presented here are presented by way of an example only, and not limitation. As such, this detailed description of various alternative embodiments should not be construed to limit the scope or breadth of the present invention as set forth below.

With reference to FIG. 1 through 5, an embodiment of a plant mover system ("system") 100 is shown and will be described. This system 100 is composed of one large box-like housing 200, comprised of a lower component 220 and a upper component 240, a large disk 300, multiple small disks 350 and a, b, c, multiple lazy suzans 360, wheels 380, a motor 600, an air pump 400, a water pump FIG. 4(720), a control panel 500, one or more plugs 450, a watering assembly FIG. 2(700). At one of each of the four corners of the system 100 sits the following components: an air pump 400, a control panel 500, a motor 600, and access to install three or more plugs 450.

FIG. 1 is a perspective view of an embodiment of the plant of the system. The upper component 240 can be seen sitting on top of the lower component 220. In the center of the system are four small disks 350a, b, c and d, which are sitting on top of the large disk 300. The large disk is interconnecting with the motor 600 enabling it to be turned. At alternate corners of the system, the air pump 400, the control panel 500, and the additional plugs 450 can be seen. At the center of the system the open mount 320 can be seen which allows water to drain and allows the watering assembly FIG. 2(700) to pass through the center.

Figure 2:
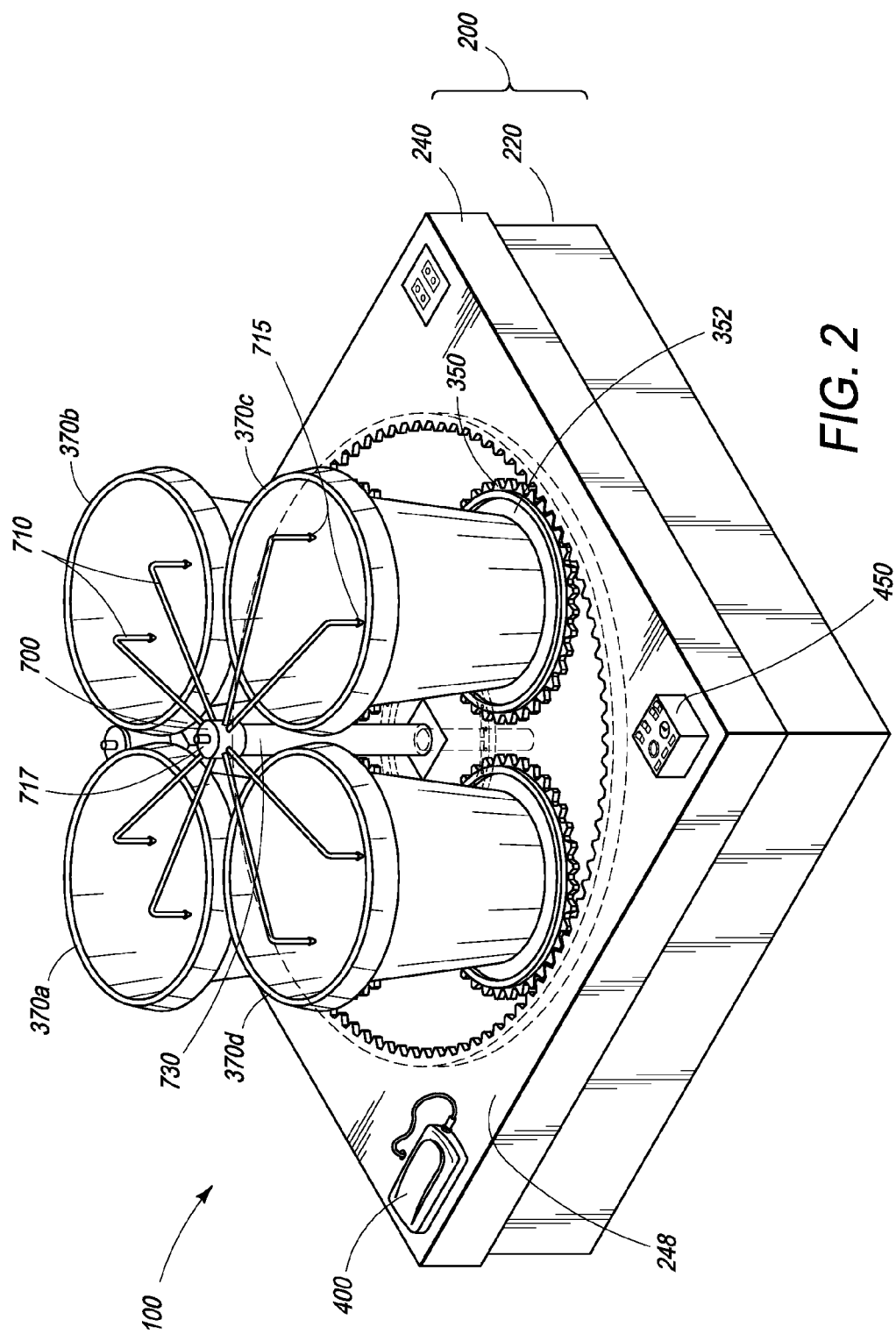
FIG. 2 is a perspective view of the plant mover system of FIG. 1 with pots and a watering apparatus in place.

Referring to FIG. 2, an embodiment of the system 100, is shown and displayed with four plant pots 370 a, b, c and d sitting on four small rotating disks 350. The pots snap into and are held firmly by the rim 352 of each of the small rotating disks. If the correct size pot is not available, the pot with the smaller radius can be used and set directly on top of the small disk 350. The watering assembly 700 is seen which is comprised of a water pump 720, a hose or other hollow tubing or pipe 730, multiple water pipes 710, and exit ports 715. The watering assembly 700 having multiple water pipes 710 a, b, c and d, is connected to the water pump FIG. 3 (720) via a swivel connection which sits on the floor 224 of the lower component 220. A hose or other hollow tubing or pipe 730 connects the water pump FIG. 3 (720) to the water pipes 710 a, b, c and d. The water and/or plant food is pumped by the water pump FIG. 3 (720) through the hose or hollow tubing 730 into the water pipes 710 and is sprayed or dripped into the plant via the exit ports 715. The exit ports 715 can be manufactured to spray, drip or flow the water into the plants depending on the water needs of the particular plant species. The water pipes 710 of the watering device 700 are crossed over one another and/or connected at their center 717 where they receive water from the water pump FIG. 3 (720) below. As the pots rotate on the small disks 350, the watering assembly 700 rotates with the pots and evenly distributes water over the top of the soil surface. A water pump FIG. 3 (720) sits on the floor of the lower component 220 and pumps water through the watering assembly 700.

Figure 3:
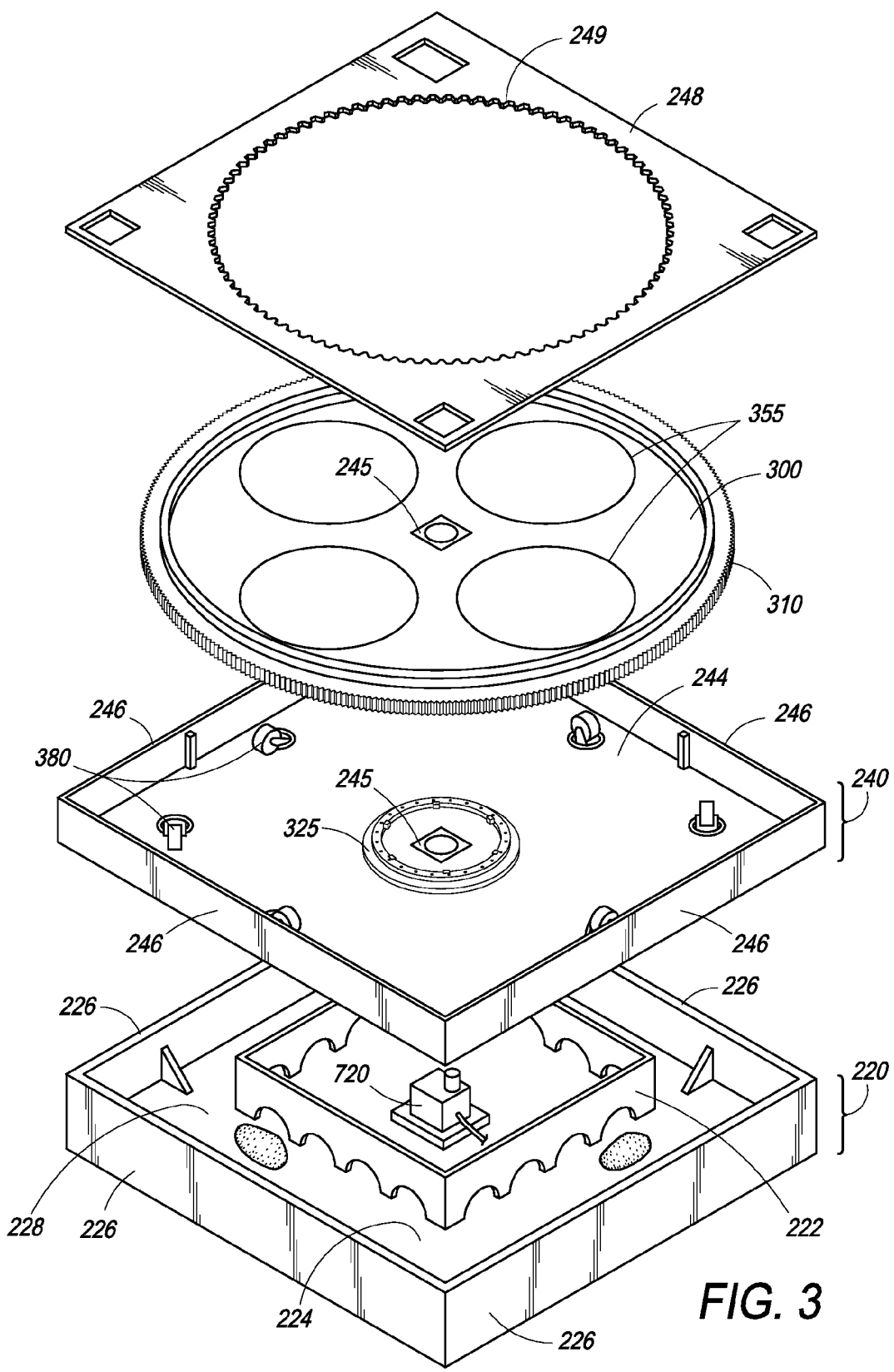
FIG. 3 is an exploded view of one of the system of FIG. 1.

Referring to FIG. 3 an exploded view of the system is shown minus the watering assembly, motor 600, air pump 400, control panel 500, and plugs 450. At the base of the system the lower component 220 can be seen. The lower component 220 has a floor 224 and at least four sides 226, which creates a reservoir or re-circulation chamber to hold water 228. In a preferred embodiment the lower component is water tight and houses a water pump 720 which is placed in the center of the floor 224. Water, which drains into the lower component and held in this area also referred to as a re-circulation chamber 228, is pumped back out via the water pump 720 through the watering assembly FIG. 2(700). This method allows the water which drains through the plants to be re-circulated and reused. In an alternate embodiment the water can also be pumped out through a drain and not re-circulated through the watering assembly FIG. 2(700).

The upper component 240 sits directly on the lower component 220. The upper component 240 is supported by a stand 222 which sits on the floor 224 of the lower component 220. This stand 222 prevents the upper component 240 from warping and bending from the weight of the filled plant pots which sit on the small disks 350. The upper component 240 of the housing FIG. 1(200) has a floor 244, four sides 246 and a top 248. The floor 244 of the upper component 240 has a hole 245 in its center where the water may drain out and portions of the watering assembly FIG. 2(700) can pass through. The hole 245 in the center of the floor 244 is surrounded by an open bearing 320. The hole in the floor 244 of the upper component 240 also functions to allow access to the re-circulation chamber 228. The top 248 of the upper component 240 has a cut-out circle 249 cut into it which is just slightly smaller in diameter than the large disk 300 which sits directly below it. The entire outer circumference of the cut-out circle 249 has evenly spaced notches. The large disk sits 0.5 to 1.5 cm below this cut-out circle 249. Multiple wheels 380 are mounted on the floor of the upper component 240. These wheels 380 support the outer edges of the large disk 300 and allow it to freely rotate when it is turned by the motor FIG. 1(600). In a preferred embodiment there are eight or more wheels 380.

The large disk 300 is placed just below the top 248 of the upper component 240 and rests on the multiple wheels 380 which are mounted to the floor 244 of the upper component 240. The large disk 300 has small gear teeth 310 on its outer edge which feed through the motor FIG. 1(600). As the motor FIG. 1(600) runs, it catches on the gear teeth and turns the large disk 300. The top of the large disk 300 is made with ridges 355 to hold lazy susans FIG. 4(360) which are placed on top of the large disk 300. A small disk 350 sits on top of each lazy susan FIG. 4(360) which has been placed on the large disk 300. In a preferred embodiment there are four small disks FIG. 1(350 a, b, c and d). The center of the large disk 300 has an open bearing 320 which provides drainage and access for the watering assembly FIG. 2 (700), and access to the re-circulation chamber 228.

The water pump 720 sits on the floor 224 of the lower compartment 240. This area is also referred to as the re-circulation chamber. The water which drains into this area is pumped via the water pump 720 back up into the watering assembly FIG. 2 (700). A plug runs from the water pump 720 and directly into the control panel 450 to power the water pump. In a preferred embodiment, there is an air curtain, which oxygenates the water. The air curtain is created by the air pump 400 pushing the water through a circulation pump to evenly distribute the air through the water. In one embodiment, air stones are placed in the re-circulation chamber to further oxygenate the water.

In another embodiment, wheels 380 can be further attached to the bottom of the system. These wheels 380 will be attached to the underside of the floor 224 of the lower component 220. These wheels 380 would allow the system to roll on the surface on which it is sitting, giving the user the ability to easily move or relocate the system when needed. The body of the system is preferable manufactured from Plexiglas, polypropylene, acrylic plastic, Kevlar® water treated woods, and/or fiberglass. The water which drains into the bottom tray or re-circulation chamber of the system is circulated by the water pump 720.

Figure 4:
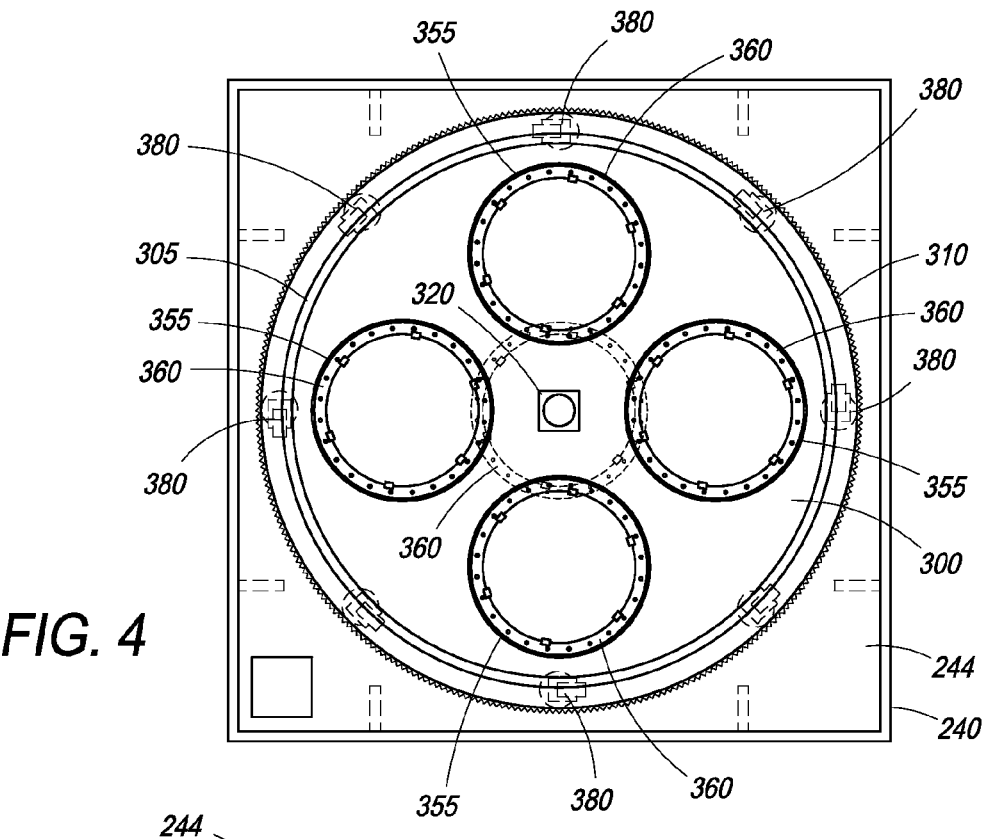
FIG. 4 is a top view of the plant mover system of FIG. 1 with the top of the upper component and the small disks removed.
Figure 5:
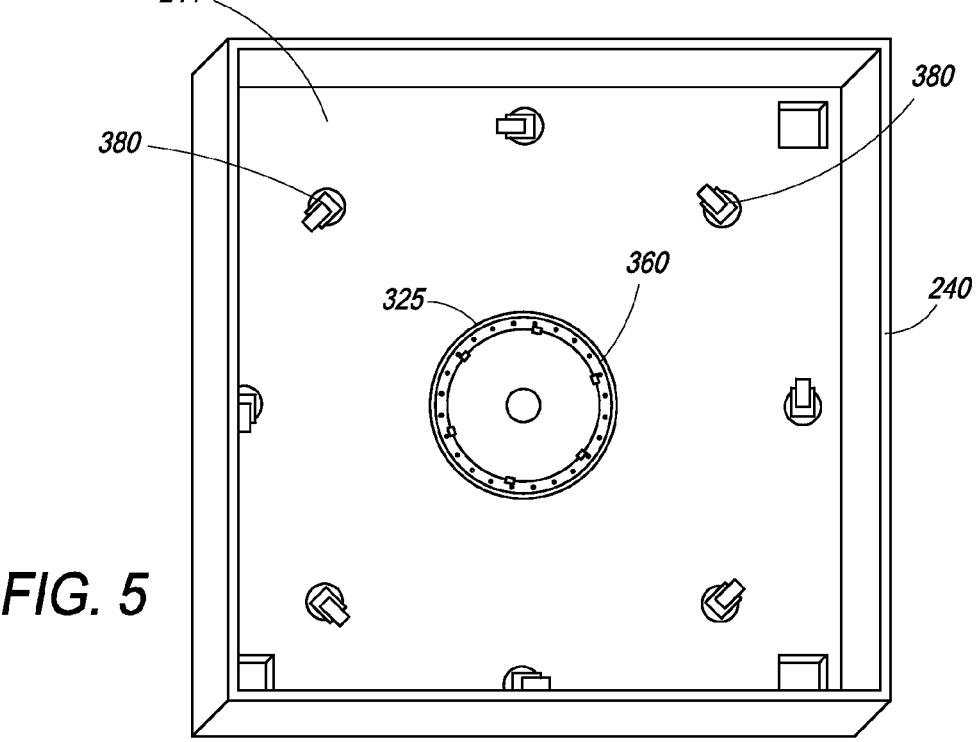
FIG. 5 is a top view of the plant mover system of FIG. 1 with all the disks removed and the top of the upper component removed.

Referring to FIG. 4, a top elevational view of the system 100 with the upper component 240 and small disks 350 removed is displayed. The gear teeth 310 can be seen on the periphery of the large disk 300. These gear teeth run through the motor FIG. 1(700) and allow the motor FIG. 1(700) to turn the large disk 300. The gear teeth 310 are preferably manufactured from a metal or other hard substance. The remainder of the large disk is preferably manufactured from plexi glass, polypropylene, acrylic plastic, Kevlar®, water treated wood, and/or fiberglass. This large disk 300 is manufactured so that it is concave making the outer surfaces are higher than the inner surface when it is installed the system 100. A ridge 305 runs the entire circumference of the disk to inhibit the water from flowing over the edge and further directing it to the center. This configuration allows the water running from the potted plants to drain into the center of the large disk and out to the center drain hole into the lower component 220 of the system and into the re-circulation 228 chamber. Wheels 380 can be seen mounted on the floor 244 of the upper component 240. In a preferred embodiment, there are eight or more wheels 380. The large disk sits on top of the wheels 380. When the large disk is pulled by the motor, the wheels allow the disk to freely rotate in a circular motion.

On the top surface of the large disk there are four circular ridges 355. These ridges 355 hold the lazy susans 360 in place so they do not move when the disk is rotating. The center of the large disk 300 contains an open bearing 320. The size of the open bearing 320 can vary. In a preferred embodiment, the open bearing 320 is 6 inches by 6 inches. The open bearing 320 allows the large disk to be connected to the lazy susan and its lower support. A lazy susan 360 is further placed on directly below the large disk on top of a center support to support the center of the large disk. A lazy susan 360 is placed on a center support piece which is set on the center of the floor 244 of the upper component 240 and the upper large disk is set on top of this lazy susan.

FIG. 4 shows a top elevational view of the plant mover system 100 with all the disks and the top of the upper component 244 removed is shown and displayed. This view is looking down into the upper chamber 240. The center lazy susan 360 on top of the center support 325 which supports the large disk FIG. 4(300) can be seen. The wheels 380 which support the large disk 300 can also be seen in this figure. There are holes cut into the floor of the upper component at two of the corners. These holes provide access for either an air pump, motor, control panel or electrical outlet.

Figure 6:
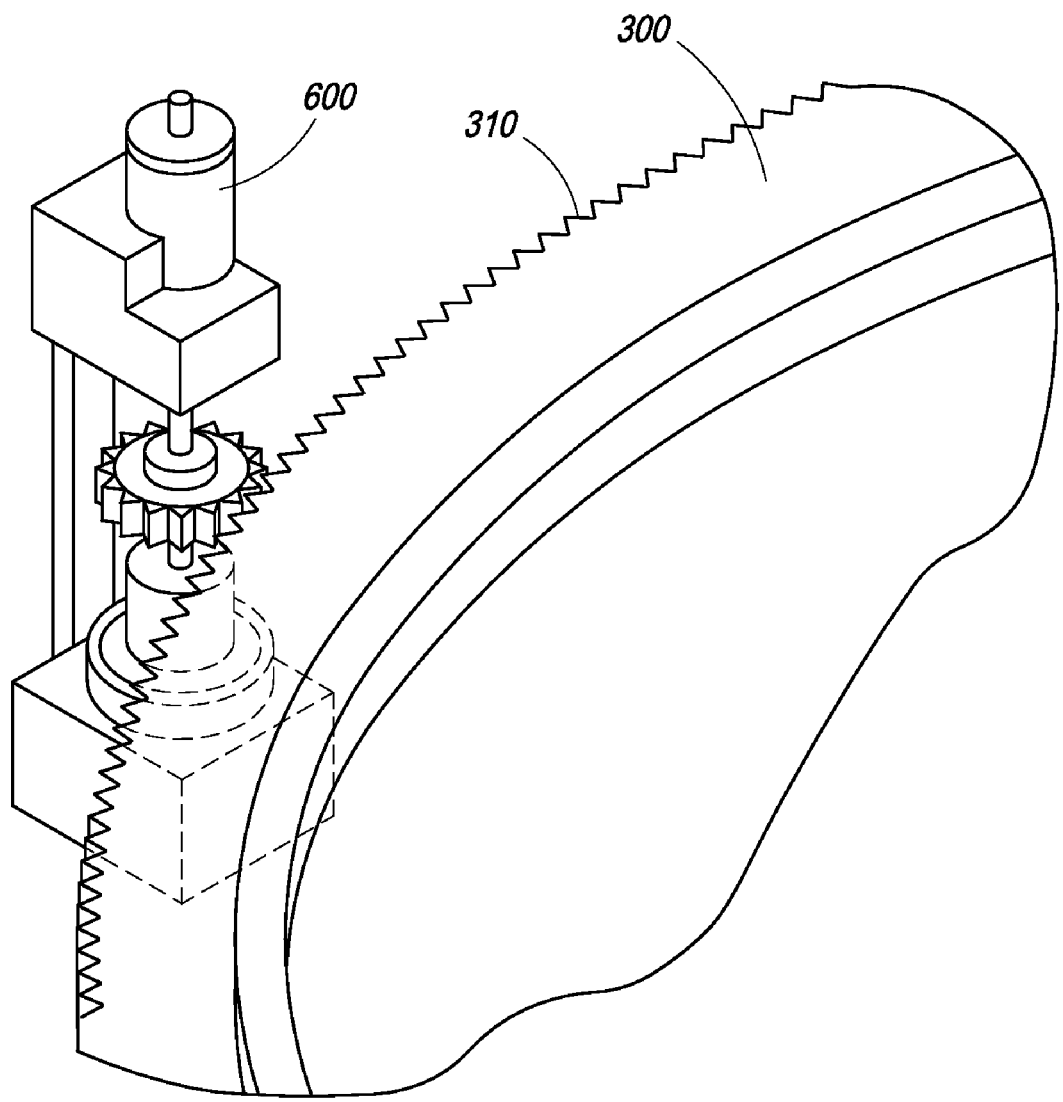
FIG. 6 is a close-up view of the teeth of the large disk running through the motor of the system of FIG. 1.

FIG. 6 is a close-up view of the gear teeth 310 of the large disk 300 running the motor 600. The motor turns the large disk by catching on the gear teeth. As the large disk 300 turns, the small disks FIG. 1(350) are turned as well.

Figure 7:
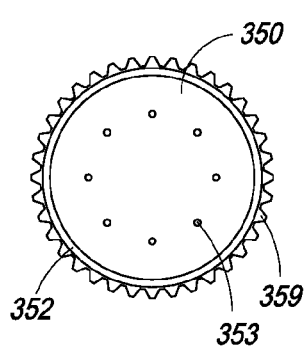
FIG. 7 is a top view of the one of the small disks of the plant mover system of FIG. 1.

Referring to FIG. 7, a top view of one of the small disks 350 of the plant mover system 100 is shown and displayed. The notches 359 on the outer circumference of the entire disk can be seen. A ridge 352 runs the entire circumference of the small disk. This ridge 352 allows the correctly sized plant pot to be held firmly in place. Holes 353 run through each of the small disks allowing water to drain from the pots through the disk. The water passes through the holes and lands on the large disk 300. This water then runs to the center of the large disk 300 and flows through the center at the open bearing 320 into the re-circulation chamber at the bottom of the system 100. The water can then be re-circulated by the water pump 720.

The outer edge of each of the small disks has notches 359 which are the same size as those on the circumference of the cut-out circle FIG. 3(249). The notches of the small disks 350 connect with the notches of the cut-out circle FIG. 3(249) of the upper component lid FIG. 3(248). As the motor 600 rotates the large disk FIG. 1(300) and each of the small disk 350 which sits on top of the large disk FIG. 1(300) is turned. Each of the small disks is turned in a second rotation by its notches catching on the notches 359 of the cut-out circle FIG. 3(249), which sit in line with the small disks 350. As the large disk FIGS. 1 and 3(300) is rotated in a clockwise fashion, it in turn rotates the smaller disk in a clockwise fashion.

Figure 8:
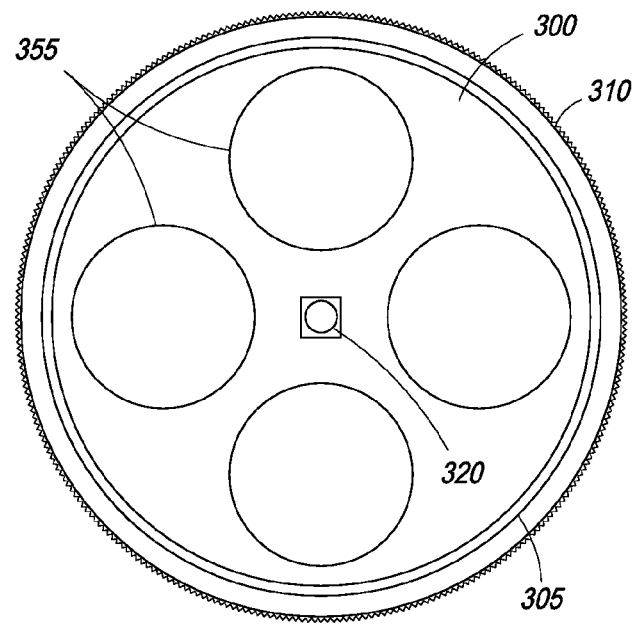
FIG. 8 is a perspective view of the large disk of the plant mover system of FIG. 1.

Referring to FIG. 8, a perspective view of the large disk 300 of the system 100 is shown and displayed. The large disk 300 is concave so that the outer surfaces are higher than the center surface. The water which falls on the outer edges then is directed towards the center of the large disk 300. At the center of the large disk, there is an open bearing 320. The entire outer edge of the large disk contains gear teeth 310. The gear teeth 310 are manufactured from metal or other hard substance. The gear teeth 310 are fed through the motor 600 and cause the large disk to rotate within the system 100.

Figure 9:
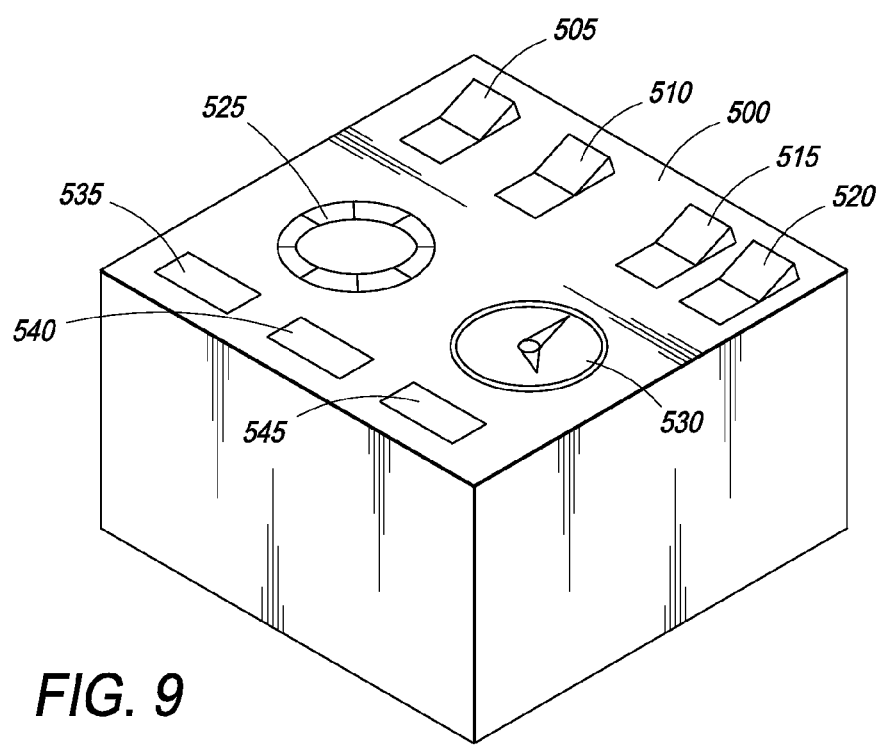
FIG. 9 is a depiction of the control panel of one embodiment of the plant mover system.

Referring to FIG. 9, an embodiment of the control panel of the system 100 is shown and displayed. In one embodiment of the system, the control panel would have a master on-off timer 505, a circulation drain pump switch 510, an auxiliary on-off switch 515, an air switch 520, a feeding timer 530, a temperature gauge 535, a P.P.M. meter 540, and a PH reader 545. The master on-off timer 505 starts and stops the rotation of the disk this timer also turns on the watering apparatus. The circulation drain pump switch 510 allows circulation and drainage of the re-circulation chamber. The feeding timer 530 controls the amount and time for the feeding of the plant. In a different embodiment, there can be fewer or more gauges contained on the control panel, depending on the complexity of the individual system 100.

Referring to FIG. 2, when a user turns the motor FIG. 1(600) on through the control panel 450, the large disk 300 is rotated. This rotation turns the pots 270 which contain plants and allow them to receive an even distribution of light from lights that have been placed overhead or to the sides. As the large disk 300 is rotated, the small disks 350 interconnect with the cut-out circle 248 and are turned in a second rotation. A user can also utilize the control panel 450 to turn on the watering apparatus 700. The watering apparatus 700 will then spray or drip water into the plants. The watering apparatus 700 turns as the plants are rotated in the double rotation providing an even distribution of water onto the plant. The user may also utilize the control panel to turn on and control the amount of plant food which is sprayed into the plants while the rotations are ongoing. In an alternate embodiment of this invention the user may utilize the control panel to test the ph of the soil or the nutrient level. The water, which is sprayed into the plant and drained at the bottom of the pot 370, drains onto the small disk 352 where it is passed through the holes in these disks onto the large disk 300 and is directed out the hole in the center of the large disk into the re-circulation chamber 228. The air pump 400 pumps air into the water contained in the re-circulation chamber to aerate it as explained supra.

The system 100 can be fitted with many optional components in various embodiments. Some of the optional components of the system 100 can be fitted with one or more of: water chiller, self-contained reverse osmosis process, carbon charcoal filter, a combination of the osmosis and carbon charcoal filter, a filter system, a treatment filtration modules and an ultraviolet filter.

The above description of disclosed embodiments is provided to enable any person skilled in the art to make or use the invention. Various modifications to the embodiments will be readily apparent to those skilled in the art; the generic principals defined herein can be applied to other embodiments without departing from spirit or scope of the invention. Thus, the invention is not intended to be limited to the embodiments shown herein but is to be accorded the widest scope consistent with the principals and novel features disclosed herein.

The invention claimed is:

1. A system for rotating plants, comprising:
   a housing with a lower component and upper component;
   the upper component having a bottom, four or more sides and a top with a circle cut into it, the cut-out circle having notched edges;
   a large disk sitting below the cut-out circle with a diameter slightly larger than the cut-out circle configured to rotate;
   a motor configured to turn the large disk; and
   one or more small disks with notches on their outside edge placed on the large disk configured to hold plants and turn in a second rotation by an interconnection of their notches with the notches on the outside edge of the cut-out circle.

2. The system of claim 1, wherein the lower component is a re-circulation chamber configured to capture water and pump it back out.

3. The system of claim 2, wherein a water pump is in a re-circulation chamber.

4. The system of claim 1, further including a watering apparatus configured to water plants which are rotating on the one or more small disks.

5. The system of claim 4, further including a control panel which controls one or more of the motor, the watering apparatus and air pump and water pump.

6. The system of claim 1, wherein the one or more small disks have a rim, configured to hold plant pots, and holes in their surface, configured to allow water to drain.

7. The system of claim 1, further including four or more wheels on the underside of the housing.

8. The system of claim 1, further including lazy susans placed under the large disk and the two or more small disks.

9. The system of claim 1, wherein the large disk is supported by and turns on wheels to the bottom of the upper component.

10. A system for rotating plants through light, comprising:
    a housing which contains a large disk turned by a motor, two or more small disks sitting on the large disk configured to hold potted plants;
    a watering apparatus connected to a water pump in the housing, which is configured to turn with the disks and provide water and food to the plants sitting on the two or more small disks; and
    a control panel configured to control the motor and the watering apparatus.

11. The system of claim 10, wherein the control panel is further configured to test the ph and nutrient content of the soil.

12. The system of claim 10, wherein the watering apparatus turns as the plants are turned in a double rotation providing an even distribution of water and food to the plants.

13. The system of claim 11, wherein the watering apparatus is composed of a water pump, hollow tubing or pipe, and multiple water pipes with exit ports.

14. A method for providing plants with an even distribution of light comprising:
    turning on a motor which connects with gear teeth of a large disk sitting in a housing and rotates the disk;
    placing two or more small disks containing notches on their periphery on lazy susans on top of the large disk;
    rotating the two or more small disks in a second rotation by the interconnection of their notches with notches cut in the housing;
    and placing plants on the two or more small disks.

15. The method of claim 14, further comprising watering and feeding the plants with a watering apparatus which rotates with the disks.

16. The method of claim 14, further comprising controlling the system with a control panel.

17. The method of claim 16, further comprising re-circulating the water which is given to the plants by the watering apparatus.

* * * * *